(12) United States Patent
Lee et al.

(10) Patent No.: US 11,102,957 B2
(45) Date of Patent: Aug. 31, 2021

(54) ADJUSTABLE SUPPORTING DEVICE

(71) Applicants: Timothy Joseph Lee, Springfield, VA (US); Dede Jan Croy, Fort Worth, TX (US)

(72) Inventors: Timothy Joseph Lee, Springfield, VA (US); Dede Jan Croy, Fort Worth, TX (US)

(73) Assignee: MY FAVORITE GROOMER, Fort Worth, TX (US)

( * ) Notice: Subject to any disclaimer, the term of this patent is extended or adjusted under 35 U.S.C. 154(b) by 444 days.

(21) Appl. No.: 15/975,772

(22) Filed: May 10, 2018

(65) Prior Publication Data

US 2018/0325081 A1 Nov. 15, 2018

Related U.S. Application Data

(60) Provisional application No. 62/503,949, filed on May 10, 2017.

(51) Int. Cl.
| | | |
|---|---|---|
| *A01K 15/04* | (2006.01) | |
| *A01K 13/00* | (2006.01) | |
| *A61D 3/00* | (2006.01) | |
| *F16M 11/10* | (2006.01) | |
| *F16M 11/04* | (2006.01) | |

(52) U.S. Cl.
CPC ............ *A01K 15/04* (2013.01); *A01K 13/001* (2013.01); *A61D 3/00* (2013.01); *F16M 11/046* (2013.01); *F16M 11/10* (2013.01)

(58) Field of Classification Search
CPC ...... A01K 15/04; A01K 13/00; A01K 13/001; A61D 3/00; F16M 11/10; A61G 7/1038; A47C 9/025
See application file for complete search history.

(56) References Cited

U.S. PATENT DOCUMENTS

| | | | | |
|---|---|---|---|---|
| 1,131,802 A | * | 3/1915 | Stenshoel | A01N 1/00 27/13 |
| 1,260,929 A | * | 3/1918 | Maxey | A47C 16/00 297/394 |
| 2,038,806 A | * | 4/1936 | Sellar | A47C 9/025 248/398 |
| 2,120,310 A | * | 6/1938 | Duncan | A01N 1/00 27/13 |
| 2,172,178 A | * | 9/1939 | Rosenberg | A47C 16/00 248/118 |
| 2,473,947 A | * | 6/1949 | Hamstrom | B60N 2/62 297/423.45 |
| D167,675 S | * | 9/1952 | Chancellor | D6/336 |

(Continued)

*Primary Examiner* — Magdalena Topolski
*Assistant Examiner* — Katelyn T Truong

(57) ABSTRACT

A supporting device having a curved support surface elevated above a base and angled with respect to the base, such as for the support of an animal. The support surface may be elevated above the base by an adjustable stanchion so that it can accommodate animals of different sizes. The angled support surface may be fixedly or pivotally attached to the stanchion so that it may accommodate the sloped abdomen of the animal. The support surface may be designed to have a small sagitta so that it provides unobstructed access to the sides of the animal being supported. The base may be designed and configured to have a dog-bone shaped outline. Other embodiments are described and shown.

9 Claims, 6 Drawing Sheets

(56) References Cited

U.S. PATENT DOCUMENTS

| | | | |
|---|---|---|---|
| 3,092,079 A | 6/1963 | Strebel | |
| 3,120,836 A | 2/1964 | Brauning | |
| 3,161,435 A * | 12/1964 | Halverson | B60N 2/62 |
| | | | 297/423.39 |
| 3,173,729 A * | 3/1965 | Yancie | A61G 13/1245 |
| | | | 312/209 |
| 3,250,252 A | 5/1966 | Seymour | |
| 3,524,434 A | 8/1970 | Finley | |
| 3,744,457 A | 7/1973 | Heine | |
| 3,929,309 A * | 12/1975 | De Vore | A47C 1/10 |
| | | | 248/118 |
| 3,999,762 A * | 12/1976 | Castor | A61G 7/1038 |
| | | | 482/142 |
| 4,003,341 A | 1/1977 | La Croix | |
| 4,565,409 A * | 1/1986 | Hollonbeck | A47C 16/00 |
| | | | 297/411.1 |
| 4,865,382 A * | 9/1989 | Marshall | A47C 9/025 |
| | | | 297/195.11 |
| D327,176 S * | 6/1992 | Gil | D6/330 |
| D334,254 S * | 3/1993 | Mitchell | D30/160 |
| 5,199,763 A * | 4/1993 | Wilder | A47C 9/025 |
| | | | 297/15 |
| 5,433,552 A * | 7/1995 | Thyu | A47C 3/34 |
| | | | 297/344.18 |
| 6,325,154 B1 | 12/2001 | Keeler | |
| D455,252 S * | 4/2002 | Hagans, III | D3/200 |
| 6,427,273 B1 * | 8/2002 | Berke | A47G 9/1009 |
| | | | 5/657 |
| D467,745 S * | 12/2002 | Ryan | D6/364 |
| 6,640,905 B2 | 11/2003 | Keeler | |
| 6,708,940 B2 * | 3/2004 | Ligertwood | F16M 11/10 |
| | | | 248/324 |
| 6,848,512 B2 | 2/2005 | Keeler | |
| D540,048 S * | 4/2007 | Llusca | D6/360 |
| 7,334,643 B2 | 2/2008 | Keeler | |
| 7,422,016 B2 * | 9/2008 | Klemm | A61B 90/60 |
| | | | 128/845 |
| D596,417 S * | 7/2009 | Bowen | D6/353 |
| 7,610,917 B2 * | 11/2009 | Klemm | A61B 90/60 |
| | | | 128/845 |
| 7,624,737 B2 * | 12/2009 | Klemm | A61B 90/60 |
| | | | 128/845 |
| 7,669,934 B1 * | 3/2010 | Cline | A47C 7/503 |
| | | | 297/423.45 |
| 7,673,836 B2 * | 3/2010 | Wallock | A47C 16/00 |
| | | | 248/118 |
| 8,769,744 B1 * | 7/2014 | Brown | A61G 13/1215 |
| | | | 5/636 |
| 9,314,390 B2 * | 4/2016 | Hernandez | B67B 7/16 |
| D764,194 S * | 8/2016 | Murray | D6/349 |
| D824,683 S * | 8/2018 | Holmes | D6/353 |
| 10,159,354 B2 * | 12/2018 | Rayburn | A47C 7/383 |
| 10,383,444 B1 * | 8/2019 | Parkins | A45D 44/10 |
| D862,914 S * | 10/2019 | Lenz | D6/349 |
| 10,555,613 B1 * | 2/2020 | Harris | A47C 16/025 |
| 10,617,217 B1 * | 4/2020 | Razon | A47C 3/40 |
| 2001/0035479 A1 * | 11/2001 | Roebuck | F16M 11/10 |
| | | | 248/125.1 |
| 2005/0225141 A1 * | 10/2005 | Marchand | A47C 9/025 |
| | | | 297/337 |
| 2006/0016945 A1 * | 1/2006 | Taylor | F16M 11/28 |
| | | | 248/188.5 |
| 2007/0079766 A1 * | 4/2007 | Park | A61D 3/00 |
| | | | 119/674 |
| 2010/0258688 A1 * | 10/2010 | Wang | F16M 11/10 |
| | | | 248/125.1 |
| 2011/0198897 A1 * | 8/2011 | Hosler | A47C 9/025 |
| | | | 297/195.11 |
| 2012/0006283 A1 * | 1/2012 | Katz | A61D 3/00 |
| | | | 119/753 |
| 2017/0042334 A1 * | 2/2017 | Mengshoel | A47C 3/027 |
| 2017/0105530 A1 * | 4/2017 | Sheinkop | A47C 9/025 |
| 2017/0354263 A1 * | 12/2017 | Houghson | F16M 11/28 |
| 2018/0317655 A1 * | 11/2018 | Frybarger | A47C 9/025 |

* cited by examiner

ADJUSTABLE SUPPORTING DEVICE

CROSS-REFERENCE TO RELATED APPLICATIONS

The present application claims the benefit of provisional patent application Ser. No. 62/503,949, filed 2017 May 10 by the present inventors, which is incorporated by reference in its entirety.

BACKGROUND

Prior Art

The following is a tabulation of some prior art that presently appears relevant:

| U.S. Patents | | | |
| --- | --- | --- | --- |
| Pat. No. | Kind Code | Issue Date | Patentee |
| 3,092,079 | A | 1963 Jun. 4 | Strebel |
| 3,120,836 | A | 1961 Sep. 27 | Brauning |
| 3,524,434 | A | 1970 Aug. 18 | Finley |
| 4,003,341 | A | 1977 Jan. 18 | La Croix |
| 3,250,252 | A | 1966 May 10 | Seymour |
| 3,744,457 | A | 1973 Jul. 10 | Heine |
| 6,325,154 | B1 | 2001 Dec. 4 | Keeler |
| 6,640,905 | B2 | 2003 Nov. 4 | Keeler |
| 6,848,512 | B2 | 2005 Feb. 1 | Keeler |
| 7,334,643 | B2 | 2008 Feb. 26 | Keeler |

Dog grooming and veterinarian examination tables typically feature a tethered loop that can be placed around a dog's neck to prevent it from moving about the table while being groomed or treated. However, dogs often insist on sitting down, which can make the grooming or medical treatment process difficult and time consuming for the groomer, owner, veterinarian, or technician. Additionally, dogs that are elderly, injured, or otherwise disabled can have difficulty supporting themselves for long periods of time.

While the tethered loop restricts the dog's movement to some degree, it does nothing to prevent the dog from sitting down. Therefore, groomers often physically support the dog with one hand and groom with the other hand, which increases hand, wrist, and arm fatigue and can cause long-term health issues. Veterinarians and other animal care professionals may also have similar issues when treating dogs and other animals, where sitting limits access to a significant portion of the animal for evaluation or treatment. Furthermore, bathing dogs or other animals that sit or cannot stand can be a challenge.

In U.S. Pat. No. 3,092,079 (1963), Strebel discloses a grooming table with a cradle comprising two flexible straps mounted to two parallel strap-carrying members to support an animal for grooming. The cradle is vertically adjustable and rotates about the vertical axis. The distance between the two straps and the distance between the two strap-carrying members are adjustable.

In U.S. Pat. No. 3,120,836 (1961), Brauning discloses a dog treatment table comprising an adjustable-height saddle and an overhead neck restraint that attaches to a dog's collar for the purpose of immobilizing the dog being treated. The horizontal saddle comprises a concave surface for engaging the abdomen of the dog and a strap means to releasably secure the dog to the saddle. The neck restraint comprises a vertical support, an L-shaped rod received therein, and a flexible line that attaches to the collar.

In U.S. Pat. No. 3,524,434 (1970), Finley discloses a holding device for restraining small quadruped animals comprising both a neck-restraining member and a torso-supporting unit attached to a supporting medium. The neck-restraining member is mounted to the forward portion of the support medium and has an adjustable height. The torso-supporting unit is rotatably and detachably anchored to the support medium rearward of the neck-restraining member. The torso-supporting unit comprises a yoke, a depending stem, a support shank that slidably and non-rotatably receives the yoke-stem. The upper and lower ends of the support shank are connected at a horizontally offset relation by an intermediate arm.

In U.S. Pat. No. 4,003,341 (1977), La Croix discloses a rotating grooming stand with an adjustable cradle for holding a pet. The grooming stand comprises a pedestal with a stationary base and a multi-position table rotatably mounted thereon, and a vertically adjustable upright post mounted on the table that supports the cradle. The cradle has a front portion and a rear portion connected together by a longitudinally adjustable means. The front and rear portions also have straps for restraining the pet while it is being groomed.

In U.S. Pat. No. 3,250,252 (1966), Seymour discloses a portable animal restraining apparatus comprising vertically adjustable forward and rearward frame supports with narrow and rigid U-shaped body-restraining cradles for engaging beneath and at the sides of the animal's body. The cradles are vertically adjustable, and the connection means joining the forward and rearward frame supports is longitudinally adjustable.

In U.S. Pat. No. 3,744,457 (1973), Heine discloses an animal restraining apparatus mounted to a table to immobilize an animal against vertical movement while permitting horizontal movement. The apparatus comprises an upstanding member slidably and rotatably mounted to the table, a horizontal member slidably connected to the upper end of the upstanding member, and a yoke means detachably connected to the second end of the horizontal member for engagement with the hind quarters of the animal.

In U.S. Pat. No. 6,325,154 (2001), U.S. Pat. No. 6,640,905 (2003), U.S. Pat. No. 6,848,512 (2005), and U.S. Pat. No. 7,334,643 (2008), Keeler discloses various embodiments of an adjustable horseowner and farrier's stand and an adjustable stand for the care of an animal with a base, an adjustable upright, and a cradle comprising a web, two upending arms, and a cushioning material or strap extending between the arms and above the web for receiving a horse's foot or another animal body part. The various embodiments also include other features for noise reduction and shock absorption.

While functional, the prior-art devices have many disadvantages. Particularly, the prior-art devices that have the cradle support integrated into or attached to the table (Strebel, Brauning, Finley, La Croix, and Heine) may require specialized tables or customized hardware to be manufactured and marketed, which the inventors believe may be cost prohibitive and functionally limiting for many groomers and pet owners. Additionally, facilities with multiple grooming or examination tables may require several of these devices such that all of the tables could utilize the supporting feature as needed. The inventors also believe that these devices cannot effectively be used in a tub for bathing. Furthermore, since the inventors have found that some animals may not require support for a portion or the entire duration of the groom, exam, or treatment, the inventors believe that permanently and detachably mounted devices of the prior art may not be sufficiently quick or easy to install or remove, particularly while the animal is on the table, and may require working around the device or additional time to install or remove the device as needed. Moreover, the inventors have found that the cradles of these devices may be insufficient to comfortably accept the sloped abdomens of many dogs and other animals.

Prior-art devices that are integrated into the table generally also have fixed lateral positions and require the animal to be secured to the device. The inventors believe that the required strap may obstruct access to a portion of the animal, which may make grooming and treating more difficult. Additionally, the inventors believe that U-shaped cradles which extend significantly vertically along the side of the animal, such as that in Seymour, and excessively large and cumbersome cradles, such as that in La Croix, may also obstruct significant portions of the animal and may make grooming and treating more difficult. Furthermore, the inventors believe that narrow cradles formed of straps or cords, such as that in Seymour, may not adequately distribute load for supporting the underside of an animal and may be uncomfortable for elderly, injured, or disabled animals. Also, the inventors believe that the materials used in cradles made of straps or cords may be more difficult to clean and may trap hair, fur, dirt, blood, urine, and moisture from the grooming, treatment, and bathing procedures.

The inventors also believe that the forward supports integrated into some of the prior-art devices (Finley, La Croix, and Seymour) may be excessive or unnecessary since many dog groomers use tethered grooming loops or leashes due to their effectiveness and low cost. Therefore, the inventors believe that standalone devices that are specifically designed to support the abdomens of dogs and other animals or prevent them from sitting down are needed for the grooming and animal care industries.

While standalone prior-art stands exist, the inventors believe none are suitable or practical for supporting the underside of an animal or to prevent it from sitting while being groomed, bathed, or treated. While Keeler discloses the use of his stands for grooming applications, he teaches of its use for supporting an animal's chin, which has a rigid and bony structure that closely resembles that of a horse hoof, for which his device was intended. Additionally, the stands of Keeler have shock-absorbing, noise-reducing, and shape-conforming features that the inventors believe may be unnecessary or unsuitable for the support of an abdomen or the prevention of sitting and may add unnecessary cost and complexity. In particular, the cradle's web, upending arms, and flexible strap are designed for reducing shock and securely holding a hoof in the horizontal position, and the inventors believe that such a design may not be appropriate or necessary for use under a dog or other animal's abdomen. Furthermore, the inventors have also found that the cradle's web may need to be very wide and the upending arms may need to be very tall or wide (such as what is shown in Strebel) for the flexible strap to support the underside of a dog or other animal without the upending arms poking or protruding into the abdomen. Moreover, the inventors believe that the cradles of the devices of Keeler may be insufficient to comfortably accept the sloped abdomens of many dogs and other animals.

The inventors have also found that the use of a cushioned material may be unnecessary, and the inventors believe that a permanently affixed cushioned material or strap may be more difficult to clean and may trap hair, fur, dirt, blood, urine, and moisture from the grooming, treatment, and bathing procedures. Additionally, the inventors have found that the construction of the cradle of Keeler increases the overall height of the saddle. While this may be acceptable for treating horses and larger dogs, the inventors have found that the additional height may reduce the height adjustment range capability for small stands, such as those used to treat small dogs or other animals.

What is needed is a stand that comfortably and stably supports the underside of an animal while it is being groomed, bathed, or treated. What is still needed is an adjustable and portable stand that can effectively prevents an animal from sitting down during grooming, bathing, and veterinary care.

Advantages

Accordingly, several advantages of one or more aspects are as follows: to provide a supporting stand that is portable; that is standalone; that is quickly and easily placed under an animal or removed as needed; that can be repositioned easily; that can be used on a variety of tables and other platforms such as washing basins; that works in cooperation with existing equipment such as grooming loops; that is easy to clean and does not attract animal hair, fur, dirt, blood, urine, or moisture; that can be used without a strap; that provides access to a larger portion of an animal being groomed or treated than prior-art devices; that comfortably supports a wide variety of animal shapes and sizes without complex adjustment; that has an adjustment range suitable to treat small dogs or other animals; that accepts the sloped abdomen of an animal; and that can be adjusted to accept the sloped abdomens of various animals. Other advantages of one or more aspects will be apparent from a consideration of the ensuing description and accompanying drawings.

SUMMARY OF THE INVENTION

In accordance with one embodiment, a supporting stand comprises a curved support surface elevated above a base and oriented at an angle with respect to said base. Other embodiments are described and shown.

DRAWINGS—FIGURES

Figure 1:
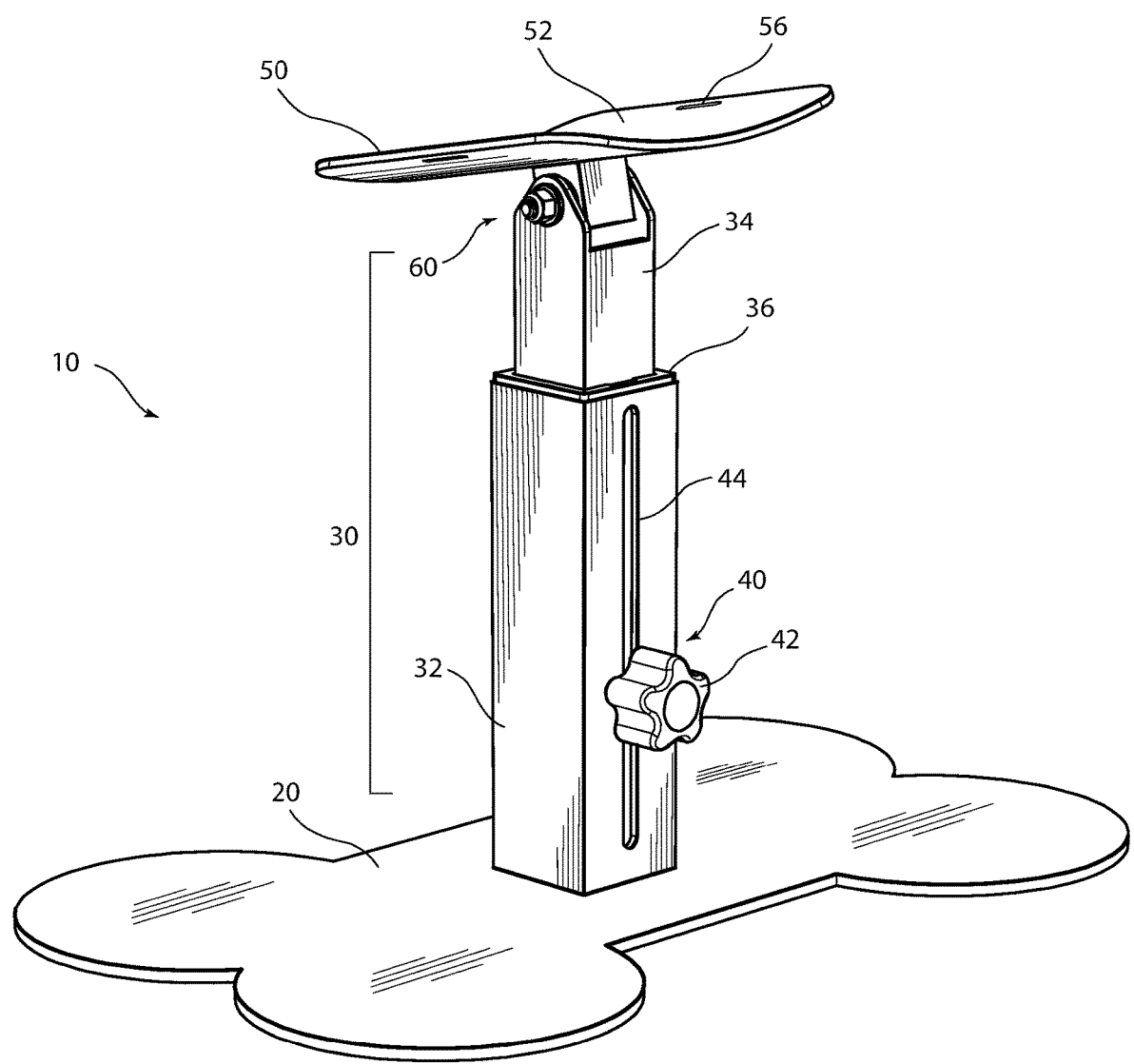
FIG. 1 is a perspective view of one embodiment of a supporting stand.

| DRAWINGS-REFERENCE NUMERALS | | | |
|---|---|---|---|
| 10 | supporting stand | 10A | additional embodiment of supporting stand |
| 20 | base | 22 | lower surface of base |
| 30 | adjustable stanchion | 32 | lower post-receiving portion |

-continued

DRAWINGS-REFERENCE NUMERALS

| 34 | support post | 34A | additional embodiment of support post |
| 36 | guide | 40 | holding mechanism |
| 42 | knobbed screw | 44 | slot |
| 46 | spacer | 48 | nut insert |
| 50 | saddle | 50A | additional embodiment of saddle |
| 52 | curved support surface | 54 | sagitta |
| 56 | strap slots | 60 | hinge |
| 62 | clevis | 64 | tang |
| 66 | bolt | 68 | nut |
| 70 | anti-friction washers | 90 | dog |
| 92 | platform | | |

DETAILED DESCRIPTION

The term "parallel" is used herein, in a broad lay sense, to mean exactly parallel or approximately parallel within some tolerance from exactly parallel.

The term "perpendicular" is used herein, in a broad lay sense, to mean exactly perpendicular or approximately perpendicular within some tolerance from exactly perpendicular.

The term "dog-bone shape" is used herein, in a broad lay sense, to mean an exact dog-bone shape or an approximate dog-bone shape within some tolerance.

First Embodiment—FIGS. 1, 2, 3, 4, 5

Figure 2:
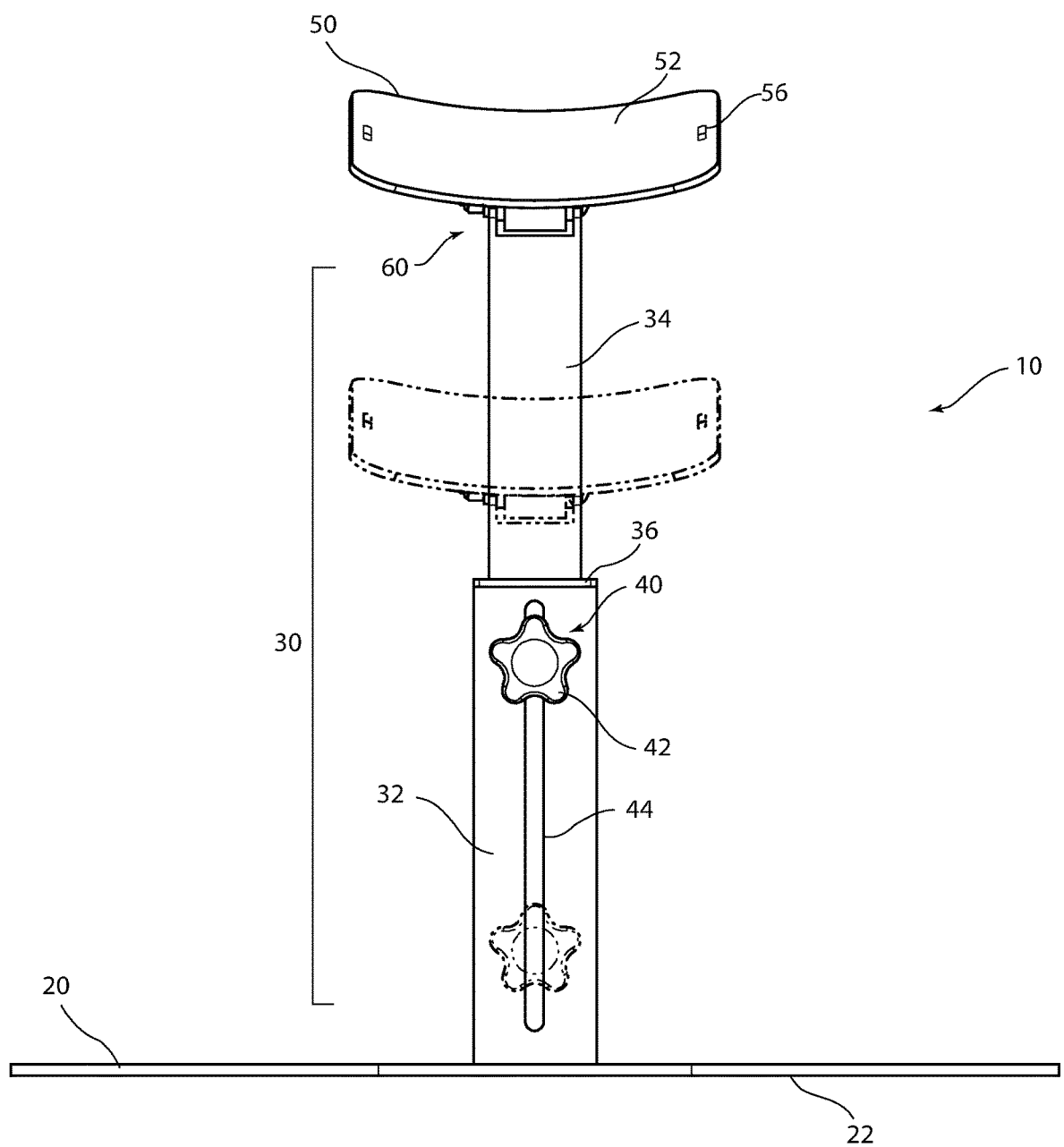
FIG. 2 is a front view of the embodiment of FIG. 1 in an extended position, with a retracted position shown in phantom lines.
Figure 3:
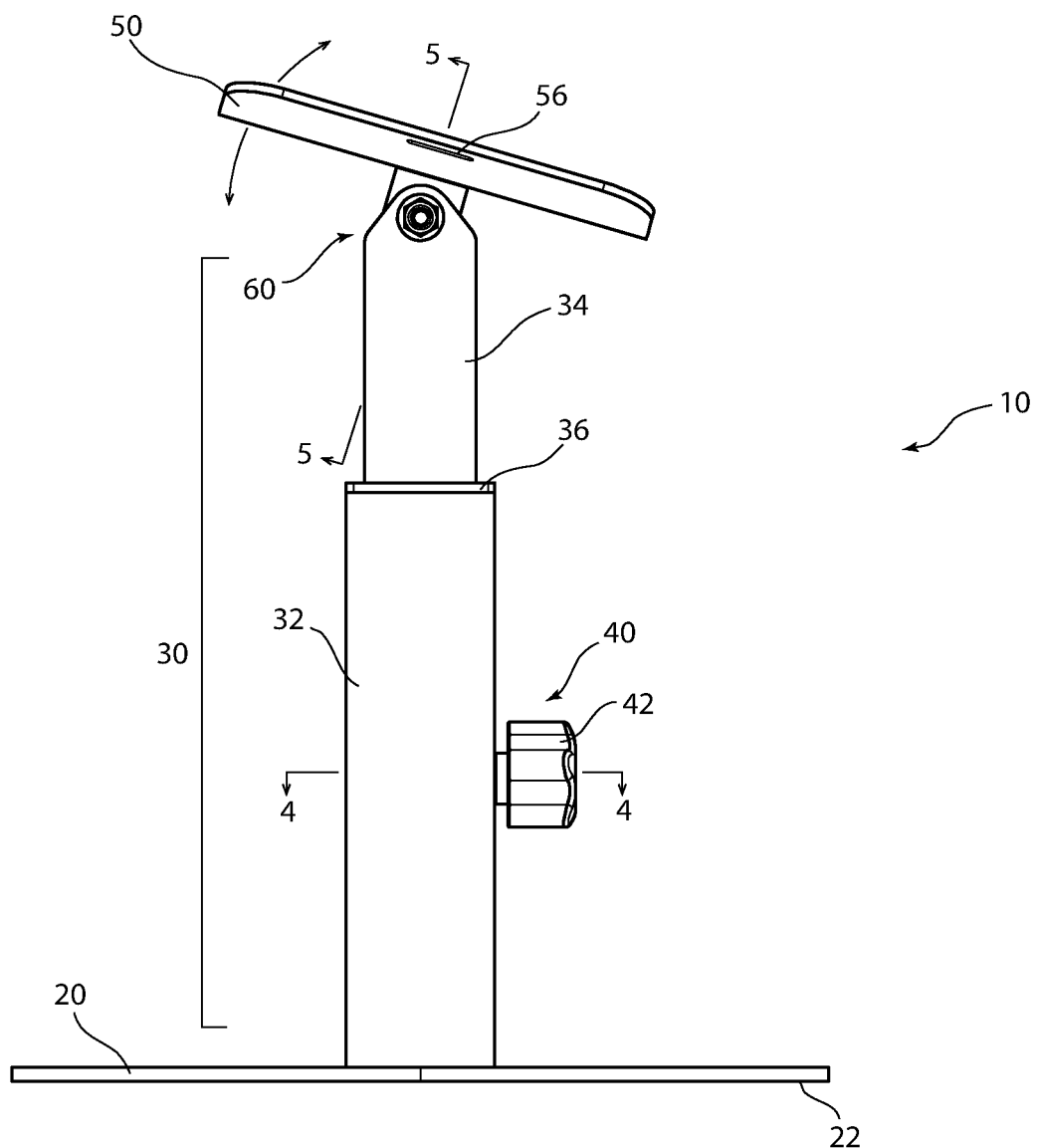
FIG. 3 is a side view of the embodiment of FIGS. 1 and 2.

FIG. 1 (perspective view), FIG. 2 (front view), and FIG. 3 (side view) show one embodiment of a supporting device or stand 10 having a cradle or saddle 50 with a generally curved or arcuate concave support surface 52 that is elevated above a base 20 by a vertically adjustable post or stanchion 30. In some embodiments, the base 20 has a generally horizontal lower surface 22 for resting on a level surface or platform including without limitation the ground, a grooming table, a veterinary table, or a washing basin or bathing tub. The axis of curvature of the support surface 52 is angled such that it is non-parallel to the lower surface 22 of the base 20 (and non-perpendicular to the vertical axis of the stanchion 30) in order to engage the sloped abdomen or tuck-up of an animal such as a dog during treatments such as grooming, bathing, or veterinary care.

In further detail, still referring to FIGS. 1-3, the base 20 is appropriately sized and configured to provide adequate stability while remaining compact and light enough for easy transport and storage when not in use. The size of the base 20 can vary depending on the range of dog sizes for which the embodiment of the supporting stand 10 is intended to accommodate. In some embodiments, the lateral dimension of the base 20 is approximately 1.5× longer than the longitudinal dimension to provide increased lateral stability and to limit interference with the animal's feet, but other aspect ratios can be used. For example, the base 20 for an embodiment intended for small dog breeds such as Shi Tzus and Scottish Terriers can be about 7 inches by 11 inches, while that for another embodiment intended for medium to large dog breeds such as Border Collies and Huskies can be about 11 inches by 17 inches. However, other dimensions can be used. In some embodiments, the base 20 is substantially rigid to increase the overall stability of the supporting stand 10. In some embodiments, the base 20 is made of 3/16-inch-thick aluminum alloy sheet to increase the weight of the base, lower the center of gravity, increase overall stability, and create a low base profile to limit interference with the animal's feet, but other materials, thicknesses, and configurations can be used. In some embodiments, the base 20 is powder coated to provide a durable and easy-to-clean surface that does not attract animal hair, fur, dirt, or fluids, but other coatings or surface treatments can be used. In some embodiments, the base 20 has a dog-bone shape, which provides additional stability by shifting material to the far corners of the base, but any suitable shape such as a rectangle, cross, circle, oval, or the like can be used. In some embodiments, anti-slip pads (not shown) can be placed on the bottom surface 22 of the base 20 to increase the friction between the bottom surface 22 and the surface on which it is resting.

Figure 4:
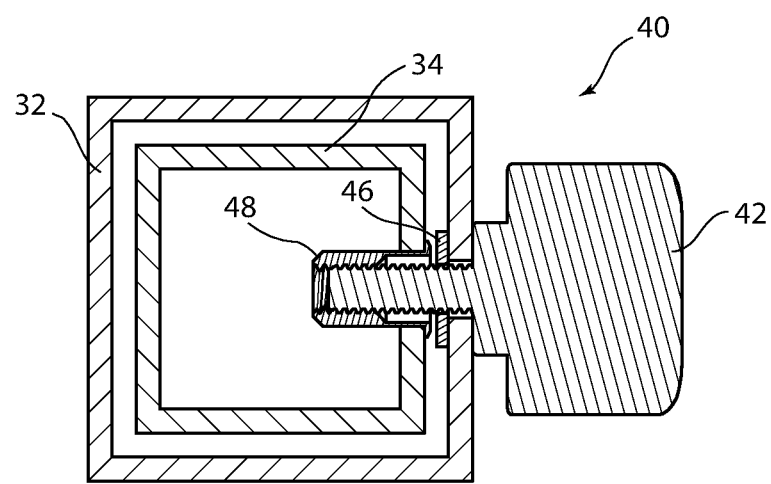
FIG. 4 is a view in detail of the portion indicated by the section lines 4-4 in FIG. 3, illustrating one embodiment of the holding mechanism.
Figure 5:
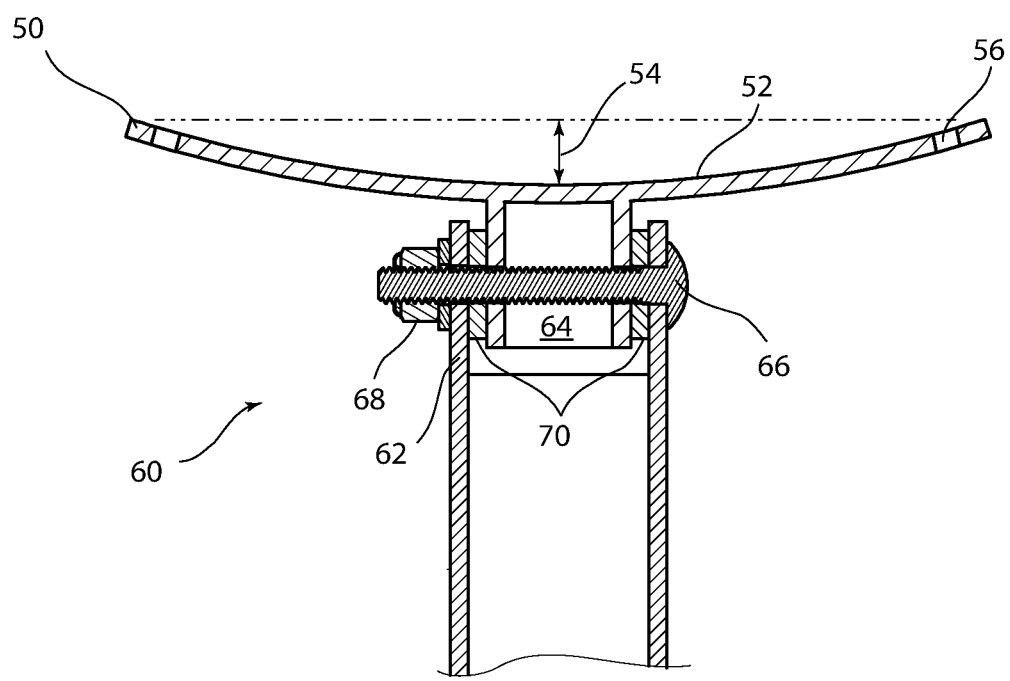
FIG. 5 is a view in detail of the portion indicated by the section lines 5-5 in FIG. 3, illustrating one embodiment of the saddle and pivoting attachment.

Still referring to FIGS. 1-3, the adjustable stanchion 30 is shown as the element for vertically adjustably positioning the saddle 50 above the base 20; however, any suitable mechanism or configuration that allows for height adjustment can be used. In some embodiments, the adjustable stanchion 30 is permanently or removably attached to the base 20 generally near or proximate the center, such as by welding or screwing. In some embodiments, the stanchion 30 comprises a lower post-receiving portion or tube 32 upending from the base 20 and a support post 34 that slides into the lower post-receiving portion 32. As shown in FIGS. 1-4, the adjustable stanchion 30 can be constructed of telescoping tubing such as by nesting aluminum square tubing, but any other sufficient material, shape, or configuration can be used. In some embodiments, the adjustable stanchion 30 is powder coated to provide a durable and easy-to-clean surface that does not attract animal hair, fur, dirt, or fluids, but other coatings or surface treatments can be used. In some embodiments, the adjustable stanchion 30 features a holding mechanism 40 for securing the adjustable stanchion 30 at different heights. In some embodiments, the holding mechanism 40 allows for continuous rather than incremental adjustment of the height of the adjustable stanchion 30. In some embodiments, the holding mechanism 40 comprises a knobbed screw or knobbed threaded stud 42 and a slot 44 in the lower post-receiving portion 32, in which the knobbed screw 42 passes through the slot 44 and threads into the support post 34. As shown in FIG. 4, a nut insert or rivet nut 48 can be used if the support post material is thin gauge or is made of a soft material such as aluminum alloy or plastic. However, other holding mechanisms can also be used. In some embodiments, the adjustable stanchion 30 can also feature one or more guides 36 or spacers 46 that align and/or reduce friction between the components of the adjustable stanchion 30, such as the lower post-receiving portion 32 and the support post 34.

Referring again to FIGS. 1-3, the height range of the adjustable stanchion 30 can vary depending on the range of dog sizes for which the embodiment of the supporting stand 10 is intended to accommodate. For example, an embodiment intended for small dog breeds such as Shi Tzus and Scottish Terriers can adjust from about 6 to 9 inches tall, while another embodiment intended for medium to large dog breeds such as Border Collies and Huskies can adjust from about 9 to 16 inches tall. However, other height ranges can be used. Some embodiments can comprise interchangeable saddles 50 or support posts 34 to change the height adjustment range of the supporting stand 10.

Referring now to FIGS. 1-3 and FIG. 5, the support surface 52 is sufficiently sized and contoured to provide distributed contact with an animal's abdomen for adequate support and can vary depending on the range of dog sizes for which the embodiment of the supporting stand 10 is intended to accommodate. For example, the support surface 52 for an embodiment intended for small dog breeds such as Shi Tzus and Scottish Terriers can be about 4 inches by 4 inches, while that for another embodiment intended for medium to large dog breeds such as Border Collies and Huskies can be about 6 inches by 6 inches. However, other dimensions can be used. In some embodiments, the support surface 52 is positioned generally near or proximate the vertical axis of the adjustable stanchion 30, so as to reduce moment loads on the stand 10 and increase stability. The support surface 52 can have a continuous curvature, a varying curvature, or an approximate curvature, such as that produced by making one or more shallow bends in a sheet of material. In some embodiments, the curved support surface 52 has a small or low-profile curvature height or sagitta 54 which supports a wide range of dog shapes and sizes and also allows unobstructed access to the sides of the animal being supported for treatment, such as for grooming, bathing, or medical care. The sagitta 54 may be as small as ³⁄₁₆ inch, but in some embodiments, it may be larger, up to and including 2 inches. Larger sagittas 54 can be used but may result in obstruction of access to the sides of the animal being supported. In some embodiments, the saddle 50 is made of ⅛-inch-thick aluminum alloy sheet to provide adequate strength and durability while allowing for economical shape forming using standard sheet metal fabrication techniques, but other materials, thicknesses, and configurations can be used. In some embodiments, the saddle 50 is powder coated to provide a durable and easy-to-clean surface that does not attract animal hair, fur, dirt, or fluids, but other coatings or surface treatments can be used. In some embodiments, the saddle 50 can also have provisions for optionally mounting a set of straps to releasably secure the animal to the supporting stand 10, such as strap slots 56 or other suitable strap connection systems. The saddle 50 can also be configured to accept accessories (not shown) including without limitation a removable cover or liner that provides different support contours, additional supporting height, padding, and disposable or washable liners or covers for hygienic purposes.

Still referring to FIGS. 1-3 and FIG. 5, in some embodiments, the saddle 50 is pivotally connected to the adjustable stanchion 30 by a pivoting mechanism or hinge 60 such that the angle of the saddle 50 can be adjusted to accommodate a wide variety of sloped abdomens of different animals. In some embodiments, the hinge 60 allows for continuous rather than incremental adjustment of the angle of the saddle 50. In some embodiments, the hinge 60 comprises a clevis 62, a tang 64, a bolt 66 passing through the clevis 62 and tang 64, and a nut 68 screwed onto the bolt 66 to secure the hinge 60 at a predetermined angle. However, other pivoting mechanisms can be used. In some embodiments, anti-friction washers 70 such as nylon washers are sandwiched between the clevis 62 and tang 64, and the bolt 66 and nut 68 can be tightened to a predetermined torque so as to reasonably secure the saddle 50 at a predetermined angle yet allow for manual adjustment of the saddle angle without loosening and retightening the nut 68. In some embodiments, the hinge 60 may have an adjustable range that can position the saddle 50 at angles between about 3 degrees from horizontal and about 37 degrees, such that it can accommodate dogs with shallow abdomen slopes such as Jack Russel Terriers and Beagles as well as dogs with steep abdomen slopes such as Poodles and Labradoodles. In some embodiments, the hinge 60 may have an adjustable range that can position the saddle 50 at angles between about 37 degrees and about −37 degrees, such that the saddle 50 can be angled in either direction, and the supporting stand 10 can be rotated 180 degrees about the vertical axis to allow operation of the holding mechanism 40 by the user's opposite hand. In some embodiments, the hinge 60 is constructed in a compact or low-height configuration such that the hinge 60 does not add unnecessary height to the stand 10, since non-adjustable structure height may limit the adjustable height range of the stand 10.

Figure 6:
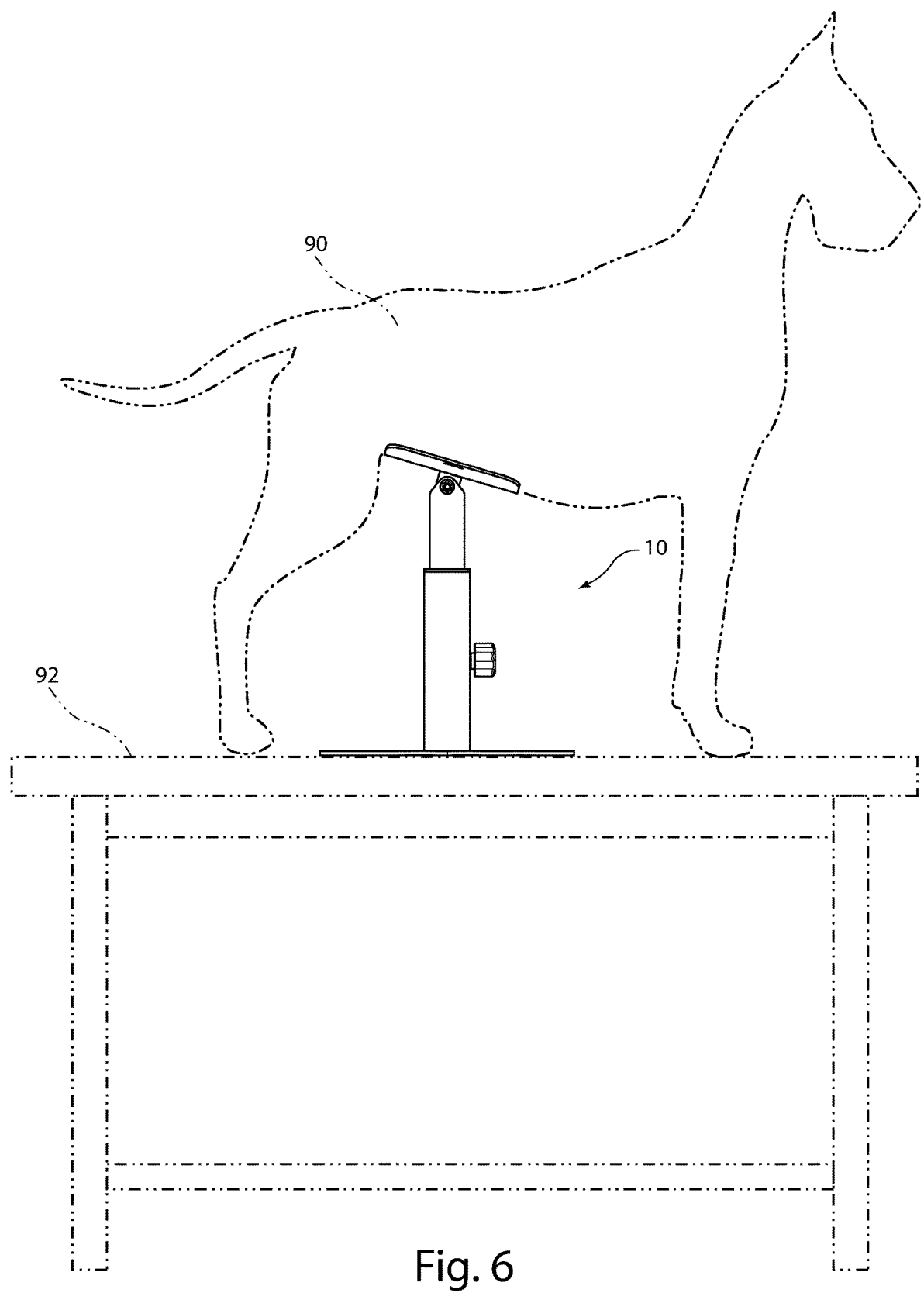
FIG. 6 is a side view of the embodiment of FIGS. 1-3 placed on a table and beneath a dog.

Operation—FIGS. 2, 3, 6

FIG. 6 (side view of stand supporting a dog) shows one embodiment of the supporting stand 10 positioned beneath a dog 90 on a generally level surface or platform 92; however, other animals can be supported. The platform 92 may be an elevated surface including without limitation a grooming table, a veterinary table, or a washing basin such that a groomer, veterinarian, or other animal caretaker can be in a comfortable standing position as they treat the animal, but other surfaces can also be used. In some embodiments, the supporting stand is portable such that it can be placed on or removed from the platform and placed or removed from beneath the dog 90 or other animal as required using one or two hands. In some embodiments, minor adjustments can be made to the placement of the supporting stand 10 while it is being used in order to accommodate changes in the posture or position of the dog 90 or animal. In some embodiments, the supporting stand 10 can be used in cooperation with existing tools and equipment including without limitation grooming loops (not shown). In some embodiments, the supporting stand 10 can be used to support animals that tend to sit during treatment or animals that are injured, disabled, or elderly; however, the supporting stand 10 can also be used for other purposes. In some embodiments, using the supporting stand 10 during the treatment or care of an animal can free the user's hand for use on other tasks, reduce fatigue and injury to the hand, wrist, and arm, and reduce the time required to perform the treatment or care.

FIG. 2 (front view) shows the vertical adjustment of one embodiment of the supporting stand 10, where the stanchion 30 can be adjusted to position the saddle 50 at various heights in order to accommodate different sized dogs or other animals; here, the phantom lines show an alternate position of the saddle 50 when the stanchion 30 is lowered. In some embodiments, the adjustable stanchion 30 also features a holding mechanism 40 for securing the stanchion 30 at different heights. In some embodiments, the holding mechanism 40 comprises a knobbed screw 42 and a slot 44 in the lower post-receiving portion 32, in which the knobbed screw 42 passes through the slot 44 and threads into the support post 34; here, the knobbed screw 42 can be loosened to release the holding mechanism 40 in order to allow the stanchion 30 to be adjusted; alternatively, the knobbed screw 42 can be tightened to secure the holding mechanism 40 in order to fix the stanchion 30 at a predetermined height to support the abdomen of the dog or animal. In some embodiments, the adjustment of the stanchion 30 requires a single person using two hands: one hand to secure or unsecure the holding mechanism 40, and one hand to raise or lower the saddle 50, although more complex mechanisms may be implemented that require only one hand for adjusting the height of the saddle 50.

Referring now to FIG. 2 and FIG. 6, the stanchion 30 can be adjusted to position the saddle 50 at or below the natural resting position of the abdomen of the dog 90 or animal so as to prevent it from sitting. Alternatively, the saddle 50 can be raised just above the natural resting position of the abdomen so as to lift the body and rear legs of the dog 90 or animal up off of the platform 92 and reduce the load borne by the animal's legs, such as for disabled, injured, and elderly animals. In some embodiments, minor adjustments can also be made to the height of the supporting stand 10 while it is being used in order to accommodate changes in the posture or position of the dog 90 or animal.

FIG. 3 (side view) shows the angular adjustment of one embodiment of the supporting stand 10, where the hinge 60 can be adjusted to position the saddle 50 at various angles (as indicated by the arrows), such as to accommodate dogs or animals with differently sloped abdomens. In some embodiments, the hinge 60 comprises a clevis 62, a tang 64, a bolt 66 passing through the clevis 62 and tang 64, and a nut 68 that can be tightened onto the bolt 66 to secure the hinge 60 at a predetermined angle. Here, the nut 68 can be loosened to release the hinge 60 in order to allow the angle of the saddle 50 to be adjusted to accommodate the sloped abdomen of the dog or animal; alternatively, the nut 68 can be tightened to secure the hinge 60 in order to fix the saddle 50 at a predetermined angle. In some embodiments, anti-friction washers 70 such as nylon washers are sandwiched between the clevis 62 and tang 64, and the bolt 66 and nut 68 can be tightened to a predetermined torque so as to reasonably secure the saddle 50 at a predetermined angle yet allow for manual adjustment of the saddle angle without loosening and retightening the nut 68.

Figure 7:
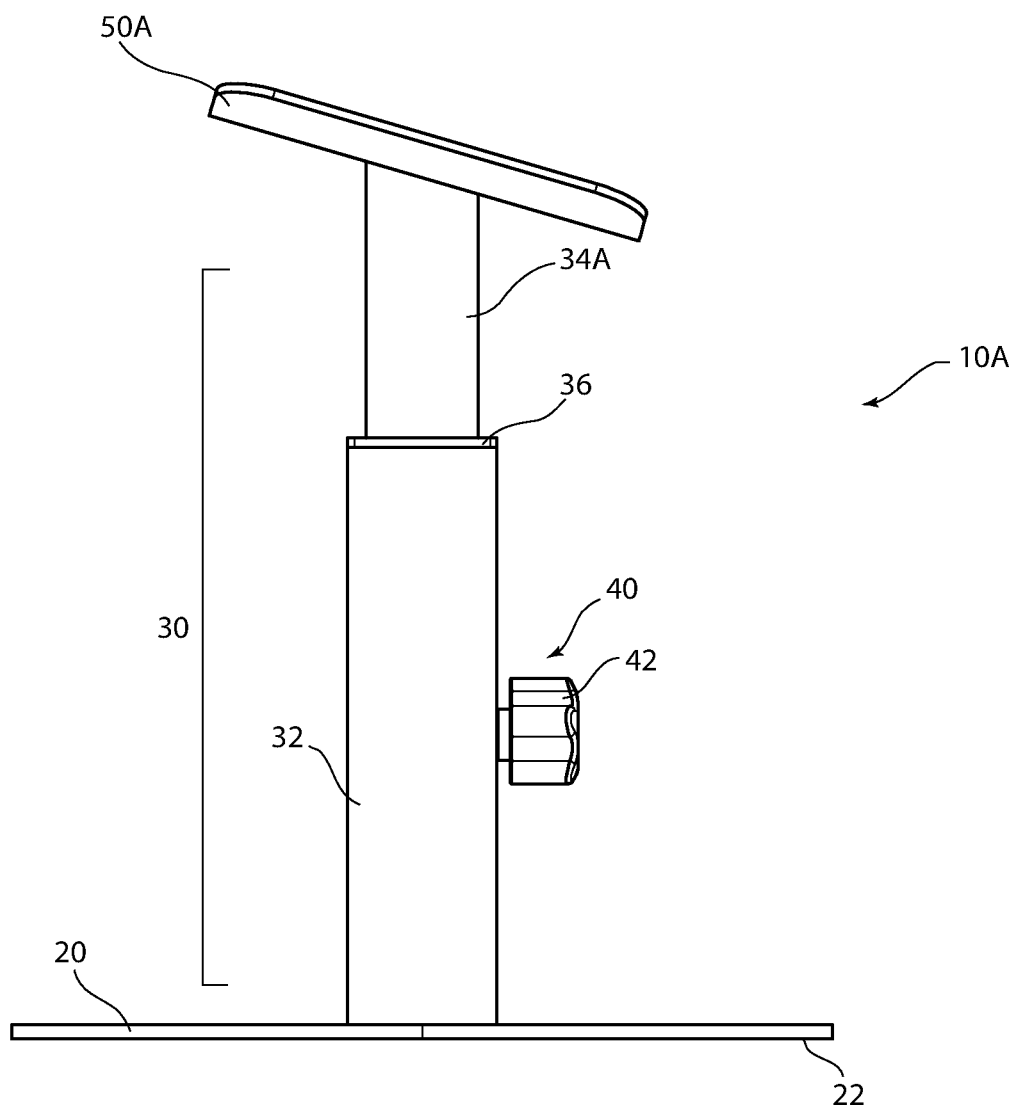
FIG. 7 is a side view of another embodiment of a supporting stand.

Additional Embodiment—FIG. 7

Referring now to FIG. 7, there is shown another embodiment of a supporting stand 10A having a saddle 50A that is elevated above a base 20 by a vertically adjustable stanchion 30. In some embodiments, the base 20 has a generally horizontal lower surface 22 for resting on a generally level surface including without limitation the ground, a grooming table, a veterinary table, or a washing basin. In some embodiments, the stanchion 30 comprises a lower post-receiving portion 32 upending from the base 20 and a support post 34A that slides into the lower post-receiving portion 32. In some embodiments, the saddle 50A is permanently or removably attached to the support post 34A, such as by welding or screwing, at a fixed predetermined angle that is non-parallel to the lower surface 22 of the base 20 (and non-perpendicular to the vertical axis of the stanchion 30) in order to engage the sloped abdomen of an animal such as a dog during grooming, bathing, or veterinary care.

The slope of the saddle 50A can vary depending on the abdomen slope for which the embodiment of the supporting stand 10 is intended to accommodate and may be as small as about 3 degrees from horizontal, but in some embodiments, it may be larger, up to and including about 37 degrees. For example, the saddle 50A for an embodiment intended to accommodate dogs with shallow abdomen slopes such as Jack Russel Terriers and Beagles can be about 5 degrees, while that for another embodiment intended to accommodate dogs with steep abdomen slopes such as Poodles and Labradoodles can be about 30 degrees. Alternatively, the saddle 50A for an embodiment intended for dogs with a range of sloped abdomens may be between about 10 and about 25 degrees.

Advantages

From the description above, a number of advantages of one or more aspects of our supporting stand become evident, without limitation:

a) The supporting stand can help prevent an animal from sitting or lying down while being treated, and it can comfortably support an injured, disabled, or elderly animal for extended periods of time.

b) The supporting stand supports the animal so that groomers, veterinarians, or other animal caretakers do not have to use one of their hands to support the animal, which frees their hand for use on other tasks, can reduce fatigue and injury to the hand, wrist, and arm, and can reduce the time required to perform the treatment or care.

c) The supporting stand is exceedingly easy to adjust to accommodate various dog or animal shapes and sizes, including sloped abdomens, and it can be made in various sizes to accommodate different ranges of dog or animal sizes.

d) The supporting stand can be used on a variety of surfaces such as grooming tables, examination tables, or washing basins and can work in cooperation with existing tools and equipment, such as grooming loops.

e) The supporting stand is made of durable materials that are easy to clean and do not attract animal hair, fur, dirt, or fluids.

f) The supporting stand is easy to move between its stowed location and the table or other work surface because it is relatively small and lightweight and does not need to be secured to the table.

g) It is easy to make minor adjustments to the placement and height of the supporting stand while it is being used in order to accommodate changes in the posture or position of the animal.

h) The small sagitta of the saddle provides access to a larger portion of the sides of the animal being groomed or treated than prior-art devices.

CONCLUSION AND SCOPE

Accordingly, the reader will see that the various embodiments of the supporting stand can adequately and comfortably support a wide variety of animal shapes and sizes, can be simply and easily adjusted, can be quickly and easily positioned and repositioned under an animal or removed as needed, can be used on a variety of tables and other platforms such as washing basins, can be used to facilitate animal treatment procedures such as grooming, bathing, and veterinary care, and can reduce the time required to perform the treatment or care.

While the foregoing written description of the embodiments enables one of ordinary skill to make and use what is considered presently to be the best mode thereof, those of ordinary skill will understand and appreciate the existence of variations, combinations, and equivalents of the specific embodiments, methods, and examples herein. The invention should therefore not be limited by the above described embodiments, methods, and examples, but by all embodiments and methods within the scope and spirit of the invention as claimed.

What is claimed is:

1. A supporting stand comprising:
a) a base having a generally horizontal lower surface, a lateral dimension, and a longitudinal dimension, wherein said lateral dimension is longer than said longitudinal dimension;
b) a saddle centrally disposed above said base consisting of a single, generally arcuate concave surface with an axis of curvature non-parallel to the lower surface of said base, wherein an orthogonal projection of said axis of curvature onto the lower surface of said base is perpendicular to the lateral dimension direction of said base, wherein said concave surface is sized to support an abdomen of a dog and has dimensions smaller than the corresponding lateral and longitudinal dimensions of said base; and wherein a sagitta of said concave surface is sufficiently small and 3/16 inches to 2 inches such that said saddle allows substantially unobstructed access to the sides of the animal being supported; and c) an elevating means for vertically adjustably positioning said saddle above said base, wherein said elevating means is immovably and centrally fixed to said base; whereby said stand can be placed beneath a standing animal, and said saddle can be positioned to engage the sloped abdomen of the animal; and wherein said saddle is attached to said elevating means via a pivoting means for adjusting the angle between the axis of curvature of said concave surface and the lower surface of said base, wherein the saddle angle can be adjusted to conform to the sloped abdomens of various animals; and wherein said pivoting means is a hinge comprising a clevis, a tang, a bolt passing through said clevis and tang, and a nut screwed onto said bolt, wherein said nut and bolt are tightened to secure the clevis and the tang at a predetermined relative orientation; and wherein said hinge further comprises a plurality of washers having anti-friction characteristics sandwiched directly between said clevis and tang such that each of the washers are in direct contact with a side of the clevis and a side of the tang, wherein said nut is configured to be tightened at a predetermined torque so as to allow manual rotation of said hinge without loosening said nut.

2. The supporting stand as in claim 1, wherein said base is generally flat and substantially rigid.

3. The supporting stand as in claim 1, wherein said base has a dog-bone shaped outline.

4. The supporting stand as in claim 1, wherein said elevating means is an adjustable stanchion.

5. The supporting stand as in claim 4, wherein said adjustable stanchion further comprises:
a) a lower post-receiving portion upending from said base;
b) a support post having a bottom end slidably received in said lower post-receiving portion; and
c) a holding mechanism for securing said support post in said lower post-receiving portion;
whereby said saddle can be secured at a non-incremental, continuous range of heights relative to the base.

6. A supporting stand comprising:
a) a base having a lateral dimension and a longitudinal dimension, wherein said lateral dimension is longer than said longitudinal dimension;
b) an adjustable stanchion upending from said base and having a vertical axis, a bottom end, and a top end, wherein said bottom end of said adjustable stanchion is centrally and immovably fixed to said base; and
c) a saddle centrally disposed above said base at the top end of said adjustable stanchion and consisting of a single, generally arcuate concave surface with an axis of curvature non-perpendicular to the vertical axis, wherein an orthogonal projection of said axis of curvature onto said base is perpendicular to the lateral dimension direction of said base, wherein said concave surface is sized to support an abdomen of a dog and has dimensions smaller than the corresponding lateral and longitudinal dimensions of said base; whereby said stand can be placed beneath a standing animal, and said saddle can be positioned to engage the sloped abdomen of the animal; and wherein a sagitta of said concave surface is sufficiently small and 3/16 inches to 2 inches such that said saddle allows substantially unobstructed access to the sides of the animal being supported; and wherein said saddle is attached to said adjustable stanchion via a pivoting means for adjusting the angle between the axis of curvature of said concave surface and the lower surface of said base, wherein the saddle angle can be adjusted to conform to the sloped abdomens of various animals; and wherein said pivoting means is a hinge comprising a clevis, a tang, a bolt passing through said clevis and tang, and a nut screwed onto said bolt, wherein said nut and bolt are tightened to secure the clevis and the tang at a predetermined relative orientation; and wherein said hinge further comprises a plurality of washers having anti-friction characteristics sandwiched directly between said clevis and tang such that each of the washers are in direct contact with a side of the clevis and a side of the tang, wherein said nut is configured to be tightened at a predetermined torque so as to allow manual rotation of said hinge without loosening said nut.

7. A The supporting stand as in claim 6, wherein said base is generally flat and substantially rigid.

8. A The supporting stand as in claim 6, wherein said base has a dog-bone shaped outline.

9. The supporting stand as in claim 6, wherein said adjustable stanchion further comprises:
a) a lower post-receiving portion upending from said base;
b) a support post having a bottom end slidably received in said lower post-receiving portion; and
c) a holding mechanism for securing said support post in said lower post-receiving portion;
whereby said saddle can be secured at a non-incremental, continuous range of heights relative to the base.

* * * * *